United States Patent [19]

Eller et al.

[11] Patent Number: 5,294,221

[45] Date of Patent: Mar. 15, 1994

[54] ADJUSTABLE VEHICLE WHEEL RESTRAINT

[76] Inventors: Donald G. Eller, 2455 Slattery, Attica, Mich. 48412; Donald A. Eller, 47066 Stephanie, Mt. Clemens, Mich. 48044

[21] Appl. No.: 95,065

[22] Filed: Jul. 20, 1993

Related U.S. Application Data

[63] Continuation of Ser. No. 905,113, Jun. 26, 1992, abandoned.

[51] Int. Cl.$^5$ .............................................. B60P 3/00
[52] U.S. Cl. .................................... 410/30; 410/20; 188/32
[58] Field of Search ............ 410/3, 9, 10, 16, 19, 410/20, 21, 22, 30, 49, 50; 188/32

[56] References Cited

U.S. PATENT DOCUMENTS

| | | | |
|---|---|---|---|
| 4,659,266 | 4/1987 | Thelen et al. | 410/19 |
| 4,786,223 | 11/1988 | Crissy et al. | 410/20 |
| 4,875,813 | 10/1989 | Moyer et al. | 410/9 |
| 5,011,347 | 4/1991 | Bullock | 410/9 |
| 5,160,223 | 11/1992 | Seitz | 410/30 |
| 5,173,018 | 12/1992 | Kissel et al. | 188/32 |

FOREIGN PATENT DOCUMENTS

| | | | |
|---|---|---|---|
| 0327212 | 8/1989 | European Pat. Off. | 410/30 |
| 0675784 | 2/1930 | France | 188/32 |
| 1486382 | 6/1989 | U.S.S.R. | 410/9 |

*Primary Examiner*—Mark T. Le
*Attorney, Agent, or Firm*—John R. Benefiel

[57] ABSTRACT

A vehicle wheel restraint device include a base plate having a wheel plate assembly adjustably mounted in a lateral direction by a channel mounted to the base plate. A pair of outwardly angled wheel plates engage the vehicle wheel, with the spacing adjustable, and a tire belt is arranged to be tightened onto the tire with a ratchet wind up mechanism also carried by the wheel plate assembly. The base plate can be swung out by release of one of a pair of floor anchor bolts and pulling on a pull cord.

8 Claims, 3 Drawing Sheets

ADJUSTABLE VEHICLE WHEEL RESTRAINT

This is a continuation of application Ser. No. 07/905,113 filed on Jun. 26, 1992 now abandoned.

BACKGROUND OF THE INVENTION

This invention concerns vehicle wheel restraints of the type including wheel chocks and tire straps. There is currently conducted extensive dynamometer and emissions testing of vehicles during development. Such devices are sometimes used to secure a vehicle in a testing enclosure during the performance of dynamometer and emissions tests.

Such restraints have often involved fastening of individual devices by means of anchor bolts received in floor channels, with the varying vehicle dimensions requiring individual fitting of the devices for each vehicle tested.

Some adjustable wheel restraints have heretofore been developed, as for example shown in U.S. Pat. Nos. 3,189,127; 2,998,102; and 1,776,935.

The prior art devices have not provided easy but precise adjustment of the wheel chock, nor for an adjustment of the wheel chock laterally, as is required for floor anchored devices.

The object of the present invention is to provide such capability in a vehicle wheel restraint device.

SUMMARY OF THE INVENTION

The present invention comprises a device including a base plate adapted to be fixed in a floor channel, by tee anchor bolts, a channel fixed to the base plate extending at a right angles to the floor channels. A wheel plate and tire strap wind up assembly are mounted to be set in any adjusted position along the length of the base plate channel to enable the wheel plates and tire strap to be aligned with the vehicle wheel.

The wheel plate assembly includes a fixed wheel plate and an adjustable position wheel plate, which are outwardly angled from each other. The adjustable wheel plate may be slid towards or away from the fixed wheel plate on a threaded bar, the bar also movable to incremental adjusted positions held with a locking pin engaging one of a series of spaced openings. An adjusting nut on the threaded bar allows a fine adjustment of the position of the adjustable wheel plate to be snugly moved into engagement with the vehicle tire.

A ratchet operated wind up reel enables a tire strap to be drawn tightly around the vehicle tire.

The base plate can conveniently be freed from one floor channel anchor bolt to enable the entire device to be swung out, pivoting on a remaining anchor bolt to be moved from under the vehicle by means of a cord attached to the other end of the base plate.

DETAILED DESCRIPTION

In the following detailed description, certain specific terminology will be employed for the sake of clarity and a particular embodiment described in accordance with the requirements of 35 USC 112, but it is to understood that the same is not intended to be limiting and should not be so construed inasmuch as the invention is capable of taking many forms and variations within the scope of the appended claims.

Figure 1:
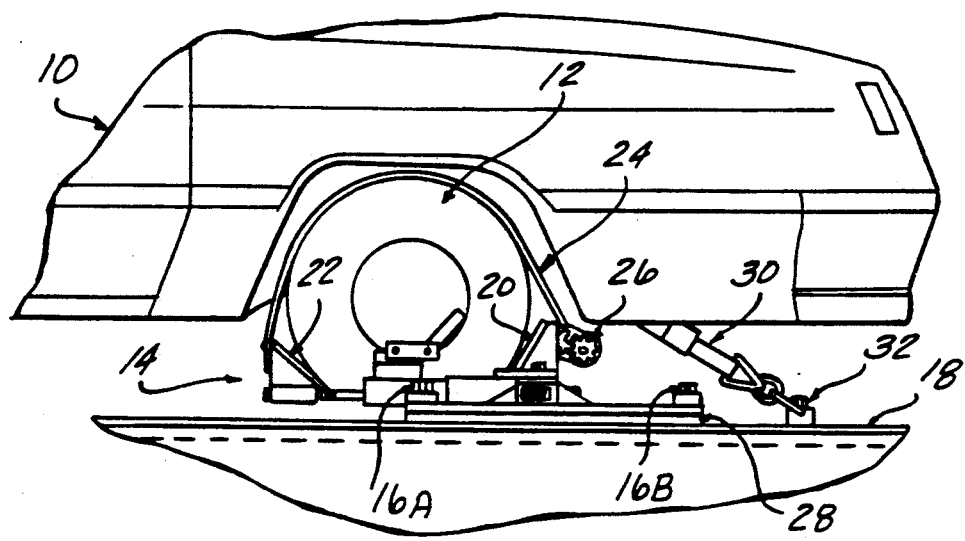
FIG. 1 is a side elevational view of a wheel restraint device installed on one side of a vehicle shown in fragmentary form.

Referring to the drawings and particularly FIG. 1, a vehicle 10 is shown having a wheel 12 engaged by a wheel restraint device 14. The wheel restraint device 14 is held by two anchor bolts 16A passing through a base plate 28 and 16B received in a floor channel 18, a parallel series of sub floor channels usually incorporated in test chambers.

The wheel 12 is confined between a fixed wheel plate 20 and an aligned adjustable position wheel plate 22, each wheel plate 20, 22 angled outwardly from each other.

A strap 24 fixed at one end passes around the top of the wheel 12 and is wound onto a ratchet belt wind-up subassembly 26 to tightly hold the wheel 12.

A separate tie down strap 30 anchored with another anchor bolt 32 connected to the vehicle body is required also. This should be located to prevent any lateral movement of the vehicle under the influence of engine vibration during testing.

The base plate 28 is underlain with a low friction plastic layer 35, and has a generally triangular main portion 36, the base side receiving the anchor bolts 16A, 16B. An extension portion 38 projects laterally inward. An adjustment channel 40 is fixed to the base plate 28, bracing gussets 42 fixed along the length thereof.

A wheel plate-belt wind up assembly 44 is mounted to be slidable along the adjustment channel 40, to be guided thereby in a transverse direction to the direction of adjustment of the wheel plates 20, 22 and to be fixed in any adjusted position with a tee bolt 46 extending through a splice plate 48.

The fixed wheel plate 20 is included in the assembly 44, braced with gussets 50 fixed to a wheel plate mounting plate 52.

The ratchet-belt wind up subassembly 26 is also included in assembly 44, mounted by bracket plates 54 fixed to a base plate 56 welded to the back of the fixed wheel plate 20.

The ratchet-belt windup subassembly 26 includes a wind up shaft 58 on which is wound the tire belt 24. A ratchet wheel 60 and panel 62 allow a torque nut 64 affixed to an extension shaft 66 to wind up and hold the belt 24.

Figure 3:
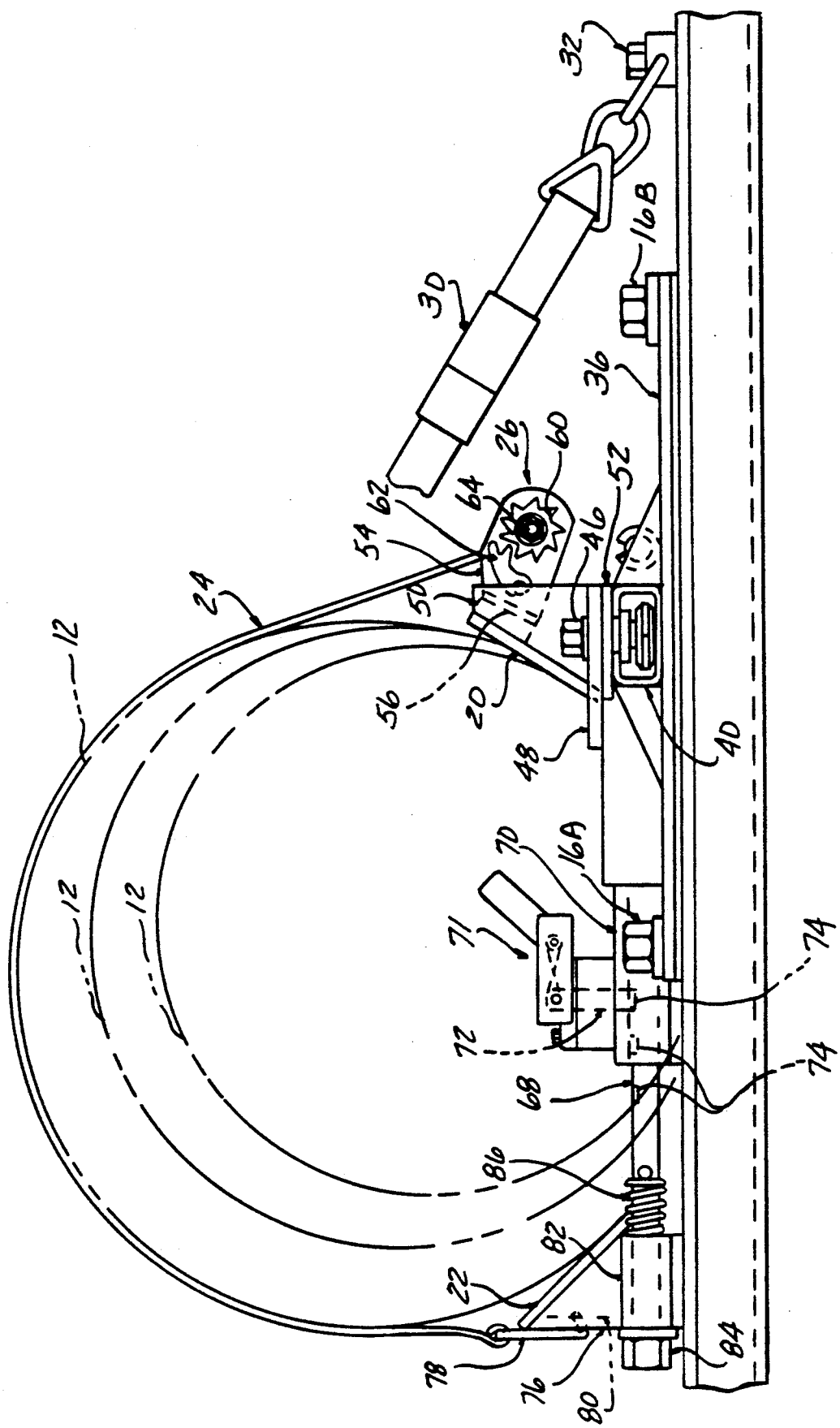
FIG. 3 is an enlarged side view of the wheel restraint device shown in FIG. 1, with an anchoring floor channel, with different size wheels shown in phantom lines.
Figure 4:
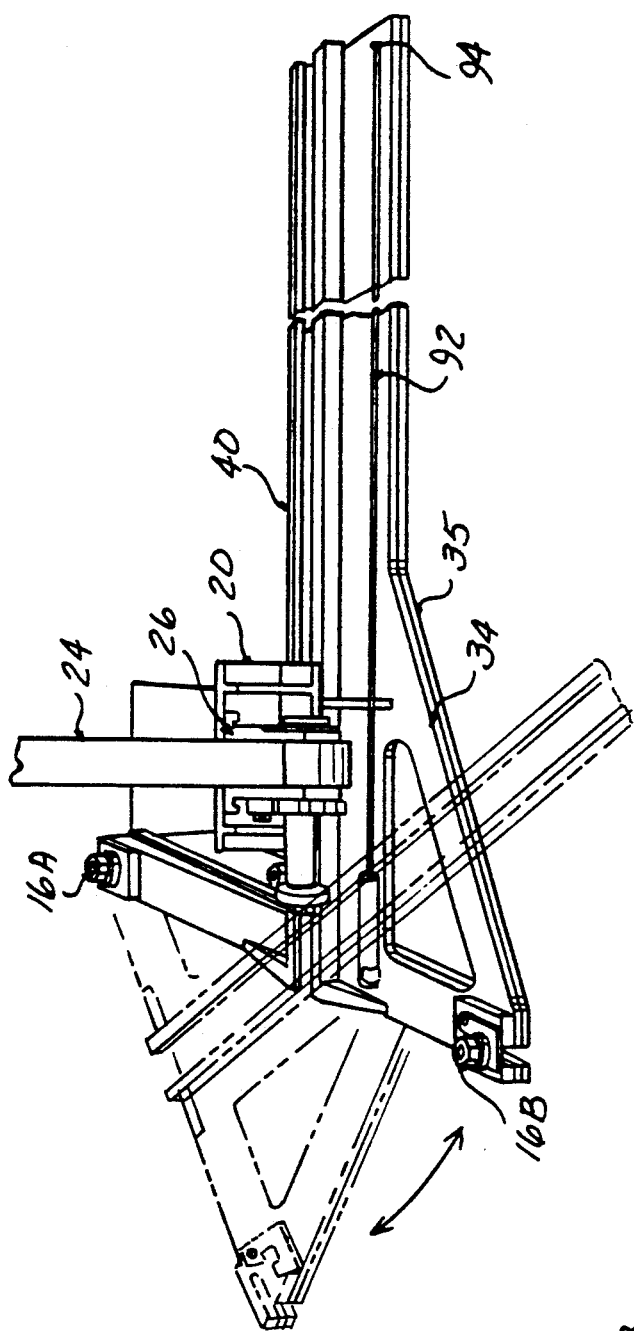
FIG. 4 is a perspective view of the wheel restraint device shown in FIGS. 1-3, showing the swing out manipulation in phantom lines.
Figure 5:
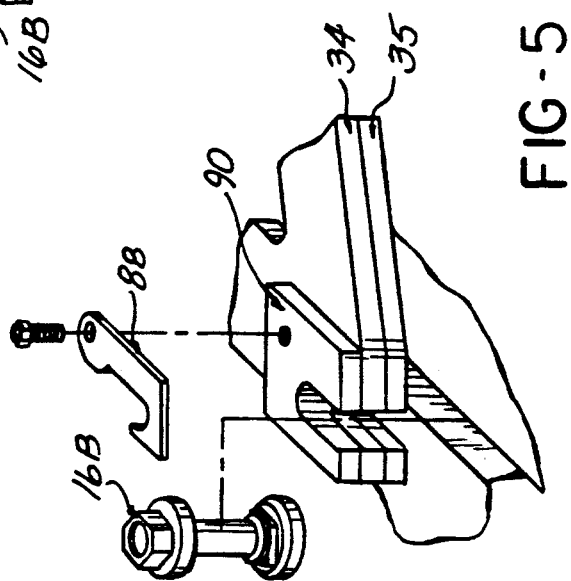
FIG. 5 is an enlarged exploded perspective view of the released anchor bolt assembly.

A wheel plate holder bar 68 extends normally to the channel 40 and is slidably mounted in a housing 70, with an incremental adjustment enabled by a locking pin 72 (FIG. 3) engaging one of a series of locating recesses 74 formed along the length of the holder bar 68. A pin retraction mechanism 71 allows raising of the pin 72 to free the holder bar 68 for adjustments of the spacing of the wheel plates 20, 22 in the longitudinal direction.

The adjustable wheel plate 22 is fixed to a mounting base 76 which also has the other end of belt 24 attached with a hook 78 and recess 80.

The mounting base includes a guide tube 82 slidably receiving the holder bar 68. The end of the holder bar 68 is threaded and receives an adjusting nut 84, which when advanced allows a fine adjustment of the spacing between the fixed wheel plate 20 and adjustable wheel plate 22 to be fit tightly to the wheel 12. A compression spring 86 forces the guide tube 82 out when the nut 84 is reversely rotated to open up the spacing.

Figure 2:
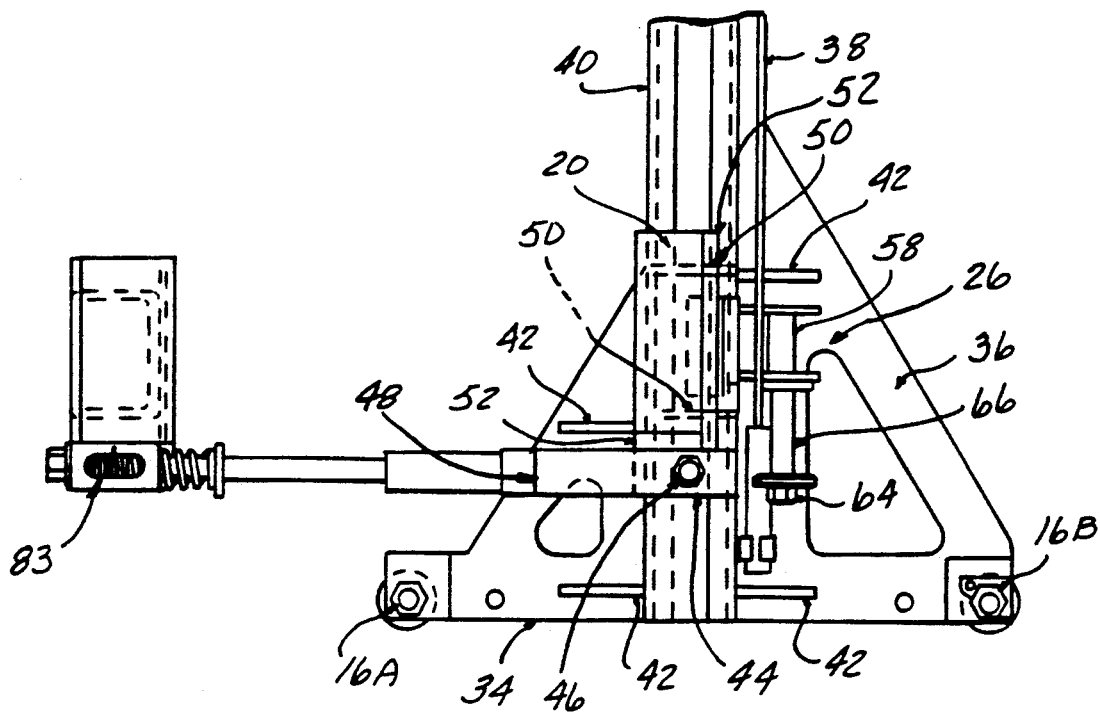
FIG. 2 is an enlarged fragmentary plan view of the restraint device shown in FIG. 1.

An indicator 83 (FIG. 2) is employed for more convenient set up in a preselected adjusted position.

The anchor bolt 16B can be removed by means of a slotted retainer plate 88 bolted to a slotted mounting plate 90 affixed to the top of base plate 34. A pull cord 92 is attached at 94 to the far end of the extension portion 38 of the base plate 34. A handle attached at the other end allows the base plate 34 to be swung out, pivoting about the anchor bolt 16A, with the low friction plastic layer 35 reducing the effort required.

The wheel restraint device 14 will normally be used in pairs, one for each front (or rear) wheel of the vehicle 10.

Thus, easy adjustment of the location and spacing of the wheel plate bolt wind up assembly 26 may be accomplished to be matched to the dimensions of a particular vehicle to be restrained.

The spacing of the wheel plates 20, 22 is also readily carried out.

The vehicle 10 is thereby very securely restrained.

What is claimed is:

1. A vehicle wheel restraint device comprising:
a base plate;
anchor means for fixing said base plate to a supporting floor;
a single guide channel affixed to said base plate extending thereacross in a first transverse direction;
a wheel plate assembly including a pair of aligned wheel plates outwardly angled from each other, one of said wheel plates movable along said guide channel to be located at positions along said guide channel; means mounting the other of said wheel plates in said wheel plate assembly to be adjustably movable towards and away from said one wheel plate in a longitudinal direction normal to said direction in which said single guide channel extends; and,
means for fixing said one wheel plate at locations along said guide channel on said base plate, means for fixing said other wheel plate in any adjusted position relative said one wheel plate, whereby said wheel plates can be fixedly located on said base plate on said supporting floor by transverse adjustment of said one wheel plate along said guide channel on said base plate and the spacing of said wheel plates adjusted by said adjustment of said other wheel plate in said longitudinal direction.

2. The vehicle wheel restraint device according to claim 1, wherein said wheel plate assembly further includes a belt wind up mechanism fixed to said one wheel plate and a tire belt fixed at one end spaced from said belt wind-up mechanism, said belt extending across said wheel plates and having the other end thereof attached to said belt wind up mechanism to be able to be tightened over a tire of a wheel disposed between said wheel plates.

3. The vehicle wheel restraint device according to claim 1, wherein said means mounting said other of said wheel plates comprises a holder bar and means attaching said other of said wheel plates to said holder bar, means mounting said holder bar for longitudinal sliding movement with respect to said one wheel plate and wherein said means for fixing said other wheel plate comprises locking means for locking said holder bar at incrementally spaced locations along the path of said longitudinal sliding movement.

4. The vehicle wheel restraint device according to claim 3, wherein said means attaching said holder bar to said other wheel plate includes fine adjustment means for continuously adjusting the position of said other of said wheel plates on said holder bar.

5. The vehicle wheel restraint device according to claim 1, wherein said means fixing said one wheel plate at locations along said guide channel comprises an anchor bolt received in said guide channel and fixed relative to said one wheel plate.

6. The vehicle wheel restraint device according to claim 1, wherein said anchor means comprises a pair of anchor bolts secured to said base plate spaced apart in said longitudinal direction normal to said wheel plates, and means for releasing one of said pair of anchor bolts from said base plate to allow swing out of said base plate on the remaining secured anchor bolt.

7. The vehicle wheel restraint device according to claim 6, further including a pull cord attached to said base plate to assist in swing out thereof.

8. The vehicle wheel restraint device according to claim 7, further including a low friction plastic layer affixed to the underside of said base plate.

* * * * *